Patented Dec. 15, 1942

2,305,043

UNITED STATES PATENT OFFICE 2,305,043

SOAP ANTIOXIDANT

William P. ter Horst, Packanack Lake, N. J., assignor to United States Rubber Company, New York, N. Y., a corporation of New Jersey No Drawing. Application January 31, 1941, Serial No. 376,857

3 Claims. (Cl. 260—398.5)

The invention relates to soap antioxidants as well as soap compositions incorporating an antioxidant as deterioration inhibitor for the soap. Commercial soaps, such as laundry soaps and toilet soaps, particularly those of clear or white or light color, have a tendency to spoil in storage after prolonged exposure to light, air, heat and/or contact with certain metals. Soap develops, at least on the surface, rancidity which includes changes in color, odor, and increase in acidity. Such deterioration of soap is believed to be the result of oxidation and/or hydrolysis.

I have discovered that the addition to a soap composition of a small quantity of the reaction product of an aliphatic ketone with ammonium thiocyanate prevents or greatly reduces deterioration and oxidation of the soap.

In further illustration of the expanse of the invention, various aliphatic ketones may be used for the reaction in preparation of the mercapto pyrimidines, particularly the dihydro pyrimidines, for example, acetone, diethyl ketone, dipropyl ketone, methyl propyl ketone, diacetone alcohol, mesityl oxide, methyl isopropyl ketone, methyl butyl ketone, methyl isobutyl ketone, acetyl acetone, methyl amyl ketone, diacetone amine, ethylidene acetone, methyl hexyl ketone, mono-hydroxy acetone, di-hydroxy acetone, methyl beta-hydroxy-ethyl ketone, methyl gamma-hydroxy-propyl ketone, etc. In many instances the ammonium thiocyanate may be replaced by thiourea or by a mono-substituted thiourea, such as methyl thiourea, ethyl thiourea, or phenyl thiourea. Also for the broad purpose of the invention various derivatives of the above mercapto bodies may be used, namely the aldehyde and sulphur derivatives, as well as the oxidized or reduced thiopyrimidines.

Example

The reaction product (A) of methyl ethyl ketone and ammonium thiocyanate was prepared as follows: 250 grams ammonium thiocyanate and 500 grams methyl ethyl ketone are heated on a steam bath under reflux during 24 hours. The unreacted methyl ethyl ketone is removed by distillation. To the residue are added 1000 grams of water. The water-insoluble material is isolated by filtration. The yield is 143 grams of light-colored powder.

The reaction product (A) is believed to be 2-mercapto-4,6-diethyl-6-methyl-dihydropyrimidine and to possess the following chemical constitution:

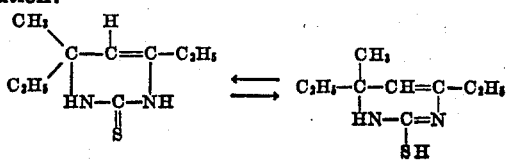

When added to soap in small quantities it has been found to prevent or greatly reduce soap deterioration.

The reaction product (A) was mixed in the proportion of .1% with a pure white toilet soap stock containing .07% free sodium hydroxide and 12% moisture. The soap was carefully neutralized and films were cast of the soap. Similar films were cast of soap free of the reaction product. Both soaps were subjected to an accelerated aging test which involves exposing the soap films in air at 105° F. for 72 hours and determining the development of odor, color and acidity. This test was carried out as described in an article entitled "Accelerated aging tests for soap" by L. B. Hitchcock and R. E. Divine, published in the January, 1939, issue of "Oil and Soap."

The results of the tests were as follows:

| Observations at end of three days film test | Color of film | Odor of film | Titration in N/10 alkali per 10 grams |
|---|---|---|---|
| Control | Dark green | Rancid | 3.5 |
| Soap containing .1% of reaction product (A). | White | Sweet | 2.6 |

These results clearly show that the incorporation in soap of a small amount of my antioxidant results in maintenance of good color and odor and low acidity. These results were substantiated by natural aging tests in white toilet soaps. Unlike the usual alkaline preservatives, my soap preservatives are neutral in reaction and hence do not interfere with the estimation of the proper end point of the reaction in the manufacture of the soap. The antioxidant may be added directly to the soap stock, or, in the case of scented soaps, it may be combined with the perfume and the mixture added to the soap stock, in accordance with commercial practice.

Having thus described my invention what I claim and desire to protect by Letters Patent is:

1. A soap stabilized against deterioration and the development of rancidity by having incorporated therein a small proportion of a product obtainable by the reaction of an aliphatic ketone with ammonium thiocyanate.

2. A soap stabilized against deterioration and the development of rancidity by having incorporated therein a small proportion of a product obtainable by the reaction of a dialkyl ketone compound with ammonium thiocyanate.

3. A soap stabilized against deterioration and the development of rancidity by having incorporated therein a small proportion of a product obtainable by the reaction of methyl ethyl ketone and ammonium thiocyanate.

WILLIAM P. TER HORST.